(12) United States Patent
Fan

(10) Patent No.: US 9,422,970 B1
(45) Date of Patent: Aug. 23, 2016

(54) SUCTION CUP

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 0 days.

(21) Appl. No.: 14/736,940

(22) Filed: Jun. 11, 2015

(51) Int. Cl.
| | |
|---|---|
| *F16B 47/00* | (2006.01) |
| *F16M 13/00* | (2006.01) |
| *F16M 13/02* | (2006.01) |

(52) U.S. Cl.
CPC ............ *F16B 47/00* (2013.01); *F16M 13/022* (2013.01)

(58) Field of Classification Search
USPC ......... 248/205.5, 205.6, 205.7, 205.8, 205.9, 248/206.1, 206.2
See application file for complete search history.

(56) References Cited

U.S. PATENT DOCUMENTS

| | | | | |
|---|---|---|---|---|
| 2008/0210834 A1* | 9/2008 | Takahashi | ............... | F16B 47/00 248/205.8 |
| 2009/0206215 A1* | 8/2009 | Tooley | .................... | A47K 5/18 248/205.8 |
| 2011/0168856 A1* | 7/2011 | Tu | ......................... | F16B 47/006 248/205.6 |
| 2011/0297804 A1* | 12/2011 | Fan | ....................... | F16B 47/006 248/206.2 |
| 2012/0112023 A1* | 5/2012 | Tollman | ............... | F16B 47/006 248/205.7 |

* cited by examiner

*Primary Examiner* — Steven Marsh
(74) *Attorney, Agent, or Firm* — Rabin & Berdo, P.C.

(57) ABSTRACT

A suction cup is disclosed, including a suction disc assembly, a rotatable unit and a hanger accessory interface; wherein the suction disc assembly including a suction disc and a pull-up element disposed on the suction disc; the rotatable unit including a carrier base, a penetration hole, and a plurality of tilt tracks, the tilt tracks being distributed around a ring-shaped inner wall of the carrier base and the penetration hole being formed at the center area of the carrier base; the hanger accessory interface being disposed inside the carrier base and contacts the suction disc through the carrier base; the hanger accessory interface including a plurality of slider blocks, with each slider block located at a corresponding tilt track; the pull-up element being engaged to the hanger accessory interface through the penetration hole; as such, suction cup provides convenience and enhance durable suction for attachment.

7 Claims, 9 Drawing Sheets

SUCTION CUP

TECHNICAL FIELD

The technical field generally relates to a suction cup, and in particular more relates to a suction cup with enhanced suction force and adherence result.

BACKGROUND

FIG. 9 shows a schematic view of a conventional suction cup. The conventional suction cup includes a suction disc 90, a shell 91, and a flip unit 92. The shell 91 is further disposed with a connection element 911 for connecting to a heavy object 95 (the connection element and the heavy object are depicted as a block in the figure). The heavy object 95 can be any object, which is hanged by the suction cup to a vertical contact surface 96. The suction cup employs the suction disc 90 to attach to the contact surface, and a variable space 901 is formed between the suction disc 90 and the contact surface 96. The flip unit 92 draws the center area of the suction disc 90 away from the contact surface 96 so that the variable space 901 is expanded to generate a suction force similar to the vacuum suction. In addition, the flip unit 92 applies a pressure during the flipping to the shell 91 so that the shell 91 presses tightly against the suction disc 90 to prevent outside air from entering the variable space 901. In other words, the longer the shell 91 presses tightly against the suction disc 90, the longer the suction attachment will last.

However, the suction cup does not always behave in an idealistic manner. The following description refers to the directions shown in FIG. 9. In general, a suction cup is attached in a vertical state to the contact surface 96. But when the heavy object 95 is hanged on the connection element 911 of the shell 91, the lower contact edge 912 of the shell 91 applies the most force to the suction disc 90. In contrast, the upper contact 913 of the shell 91 does not contact the suction disc 90 at all. The distribution of the applied force affects the attachment of the suction disc 90. Using a horizontal line crossing the center of the suction disc 90 as a division, the contact area between the suction disc 90 and the contact surface 96 above the line is smaller than the contact area below the line so that the shape of the cross-section of the variable space 901 is distorted to become a water drop. As a result, the drawing of the bottom half will continuously pull the upper half of the suction disc 90 away from the contact surface 96. With the upper contact edge 913 pressing against the suction disc 90, the outside air will seep into the variable space 901 from the upper half of the suction disc 90 until the suction disc 90 peels off from the contact surface 96. It is desirable to devise a suction cup to overcome the above shortcoming.

SUMMARY

The primary object of the present invention is to provide a suction cup durable for a long period of time.

Another object of the present invention is to provide a suction cup thinner than the suction cup currently available.

To achieve the aforementioned objects, the present invention provides a suction cup, including a suction disc assembly, a rotatable unit and a hanger accessory interface; wherein the suction disc assembly including a suction disc and a pull-up element disposed on the suction disc; the rotatable unit including a carrier base, a penetration hole, and a plurality of tilt tracks, the tilt tracks being distributed around a ring-shaped inner wall of the carrier base and the penetration hole being formed at the center area of the carrier base; the hanger accessory interface being disposed inside the carrier base and contacts the suction disc through the carrier base; the hanger accessory interface including a plurality of slider blocks, with each slider block located at a corresponding tilt track; the pull-up element being engaged to the hanger accessory interface through the penetration hole; as such, when the rotatable unit rotating, the tilt track and the slider block moving with respect to each other, resulting in the hanger accessory interface dragging the pull-up element to move vertically so that the center area of the suction disc arching up inside the penetration hole.

In application, the hanger accessory interface can be used to interface a hanger accessory, such as, hook, cup holder, hanger ring, and so on, for use in bathroom, kitchen or other flat wall surface to hanging an object to a wall.

The main feature of the present invention lies in that the rotatable unit and the hanger accessory interface are fixed together. Instead, the hanger accessory interface and the applied hanger accessory are used as support to the carried object. The rotatable unit serves as the key component to apply a force to the suction disc assembly. When an external force is applied to the hanger accessory interface, the hanger accessory interface applies a force to the rotatable unit and then the rotatable unit in turn applies a force to the suction disc. It is still possible that a small area of the hanger accessory interface will not contact the rotatable unit. However, because the rotatable is a rigid component, the rotatable unit can still presses the ring-shape contact surface to the suction disc to prevent the air from leaking into the suction disc. Therefore, the suction effect is enhanced and the attachment duration is prolonged.

The foregoing will become better understood from a careful reading of a detailed description provided herein below with appropriate reference to the accompanying drawings.

BRIEF DESCRIPTION OF THE DRAWINGS

The embodiments can be understood in more detail by reading the subsequent detailed description in conjunction with the examples and references made to the accompanying drawings, wherein.

DETAILED DESCRIPTION OF THE DISCLOSED EMBODIMENTS

Figure 1:
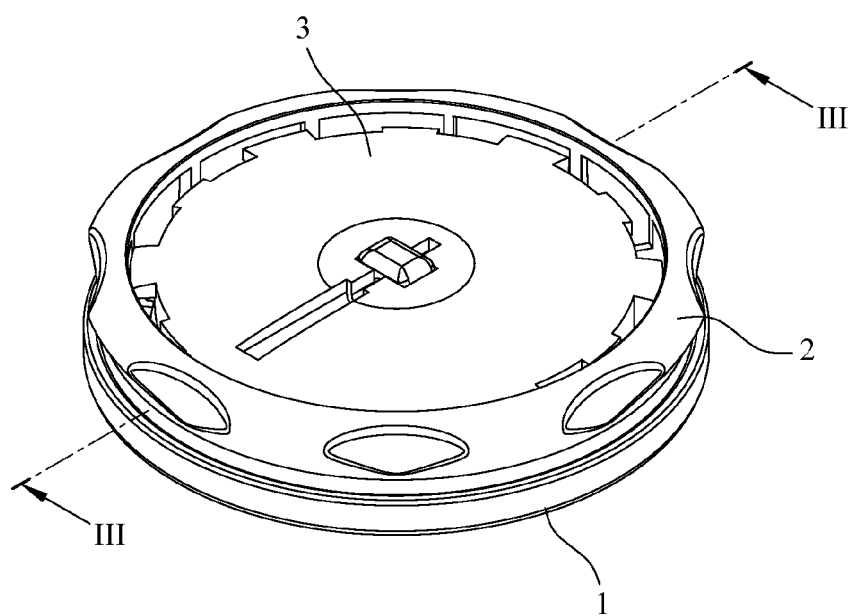
FIG. 1 shows a schematic view of an exemplary embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
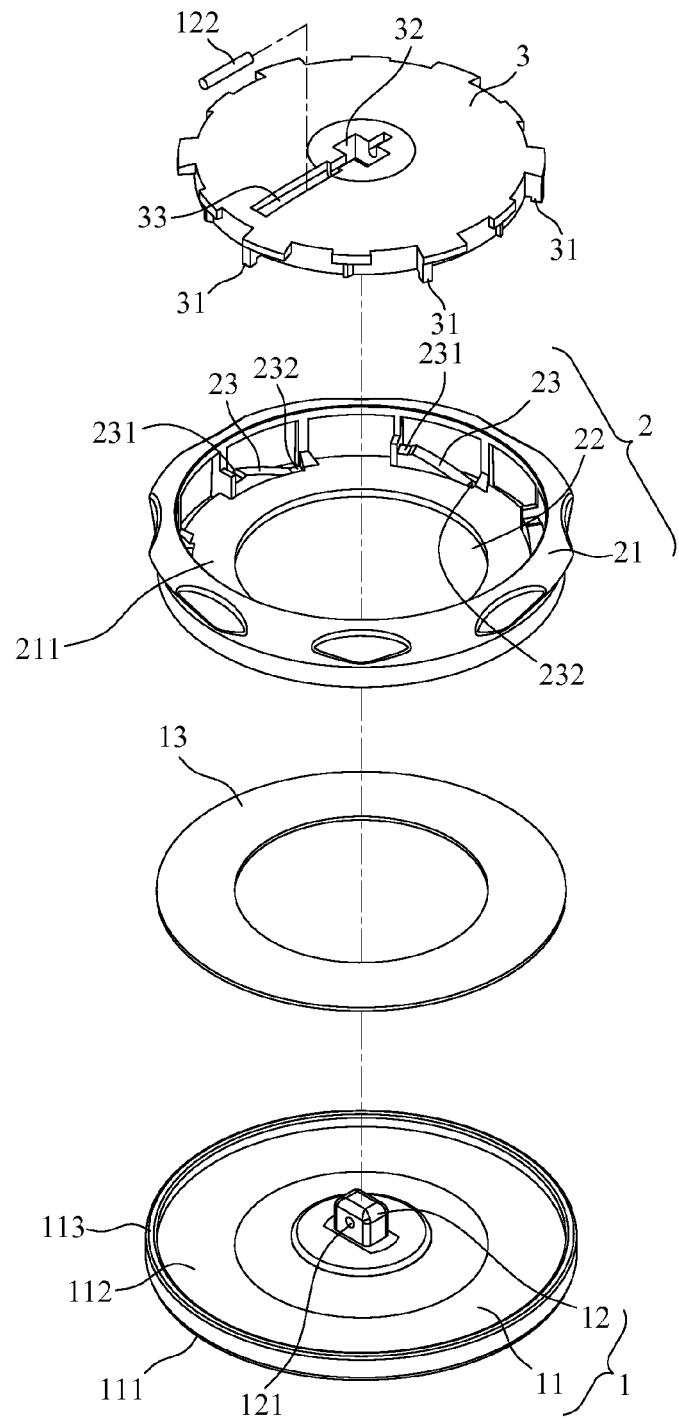
FIG. 2 shows an exploded view of the exemplary embodiment.

FIG. 1 and FIG. 2 show schematic view and an exploded view of the suction cup of the present invention according to an exemplary embodiment. The suction cup includes, from the bottom up, a suction disc assembly 1, a rotatable unit 2 and a hanger accessory interface 3. The suction disc assembly 1 is to attach to a flat surface, and the rotatable unit 2 is confined between the suction disc assembly 1 and the hanger accessory interface 3. When the rotatable unit 2 rotates, the rotatable unit 2 applies a pressure to the surface of the suction disc assembly 1 close to the edge. The center area of the suction disc assembly 1 is pulled by the hanger accessory interface 3 to arch up to cause the suction disc to create a suction force for attachment.

Figure 3:
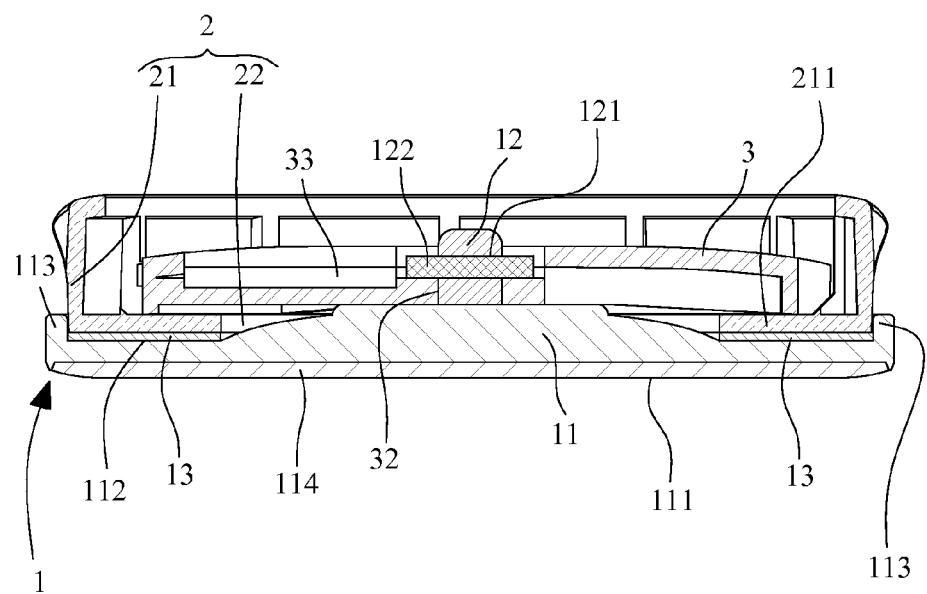
FIG. 3 shows a cross-sectional view along the III-III line of the exemplary embodiment.

The suction disc assembly 1 includes a suction disc 11 and a pull-up element 12. The suction disc 11 has a round shape, with a suction side 111 and a pressed side 112, opposite to each other. The suction side 111 includes a soft or adhesive attachment layer 114 (as shown in FIG. 3). The attachment layer 114 is made of a material the same as or different from the suction disc 11. The pull-up element 12 is fixed to the suction disc 11, and extends upwards from the center of the pressed side 112. The center area of the pressed side 112 where the pull-up element 12 is located shows an upward arc-shaped convex in order to enhance the strength and the restoration ability of the connection. An protruding ring 113 is formed at the edge of the pressed side 112. The pressed side 112 is the surface directly contacting the rotatable unit 2. To reduce the friction generated by the rotation of the rotatable unit 2, the pressed side 112 must have a surface with a low friction coefficient, such as, an oil film is applied to the surface. The present embodiment includes a contact plate 13 disposed on the suction disc assembly 1. The contact plate 13 is a ring-shape smooth thin plate with low friction coefficient and anti-abrasion, such as, plastic thin film. The diameter of the contact plate 13 must be smaller than the inner diameter of the protruding ring 113. When assembled, the contact plate 13 is attached to the pressed side 112. Because the contact plate 13 is soft and flexible, the contact plate 13 will not affect the suction disc 11 to attach to a surface. In other embodiment, an anti-abrasion low friction coefficient surface can be formed on the pressed side 112 during the injection molding process of manufacturing the suction disc 11.

The rotatable unit 2 includes a carrier base 21, a penetration hole 22 and a plurality of tilt tracks 23. The carrier base 21 includes a ring-shape inner wall 211, and the plurality of tilt tracks 23 is distributed evenly around the ring-shape inner wall 211 in a protruding manner. The penetration hole 22 is formed at the center area of the ring-shape inner wall 211 of the carrier base 21. The carrier base 21 is to carry the hanger accessory interface 3. The tilt tracks 23 have a slant top surface, with a first positioning trench 231, which is a flat surface close to the top location of the slant top surface and a second positioning trench 232, which is a flat surface close to the bottom location of the slant top surface. The location of the first positioning trench 231 is lower than the top of the slant top surface.

The hanger accessory interface 3 has a disc shape, with a plurality of slider blocks 31 distributed around the circumference of the hanger accessory interface 3. The slider blocks 31 protrude from the bottom surface of the connection element 3. There are the same number of slider blocks 31 and the tilt tracks 23. When assembled, the hanger accessory interface 3 is disposed inside the carrier base 21 and contacts the suction disc 11 through the carrier base 21. Each slider block 31 is located at the corresponding tilt track 23. The pull-up element 12 is engaged to the hanger accessory interface passing through the penetration hole 12. The engagement can be accomplished by various means, such as, a screw or adhesive glue can be used to fix the pull-up element 12 to the hanger accessory interface 3. The present embodiment includes a via hole 32 and a bolt trench 33 disposed at the center area of the hanger accessory interface 3. The bolt trench 33 is connected to the via hole 32 in the diameter direction without actual passing through the hanger accessory interface 3. The via hole 32 has a shape matching the pull-up element 12. The pull-up element 12 further includes a bolt hole 121 and a bolt 122. When assembled, the pull-up element 12 passes through the penetration hole 22 to enter the via hole 32. Then, inside the bolt trench 33, the bolt 122 is partially inserted into the bolt hole 121 so as to fix the pull-up element 12 and the hanger accessory interface 3.

Figure 4:
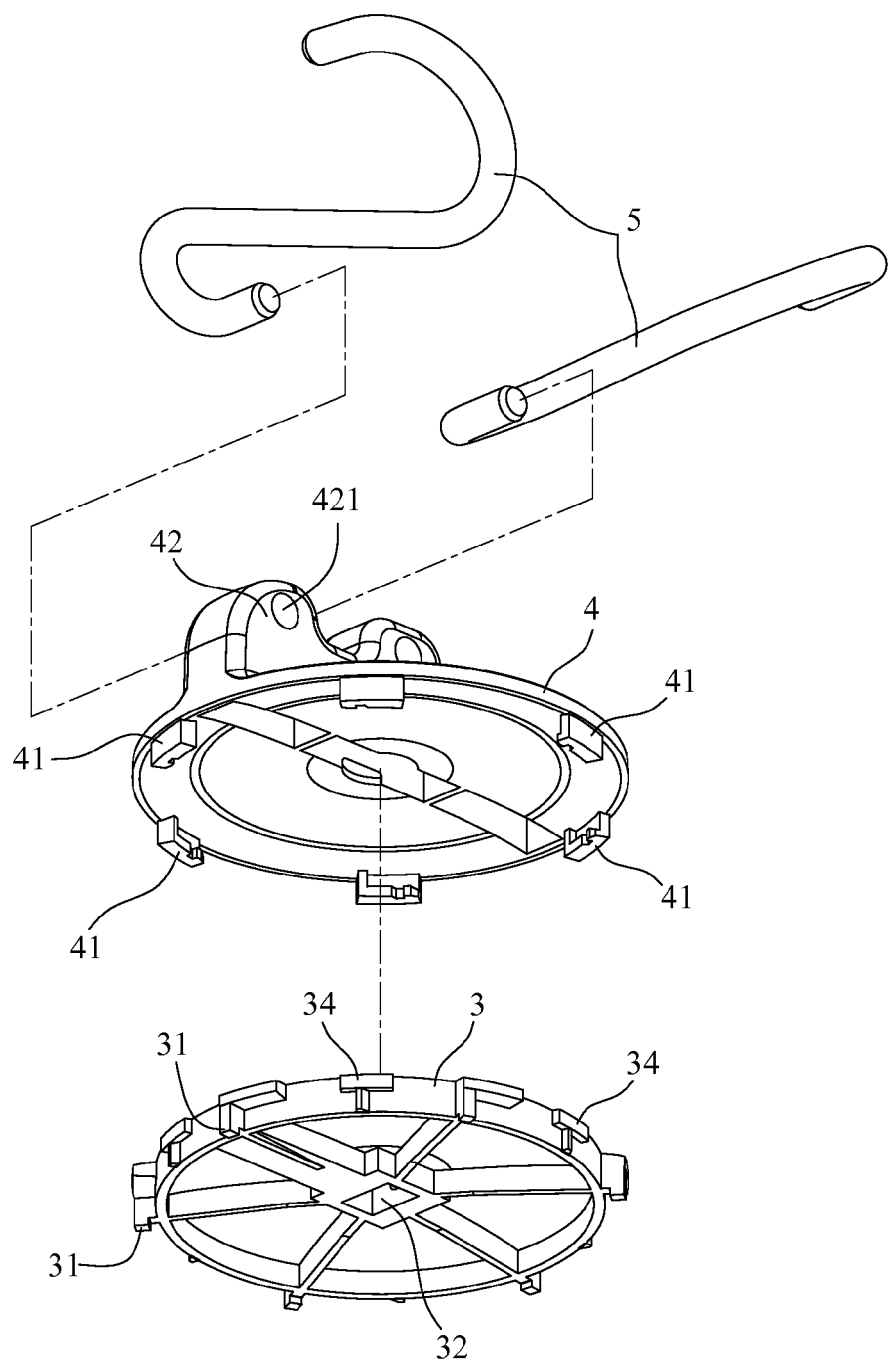
FIG. 4 shows an exploded view of an hanger accessory of the exemplary embodiment.

The hanger accessory interface 3 is to carry the object. In actual application, an hanger accessory will be disposed to the hanger accessory interface 3. The hanger accessory can be, such as, a hanging hook, a buckle, a cup holder, and so on. The following embodiment is meant for illustrative, instead of restrictive. As shown in FIG. 4, the hanger accessory includes a fix unit 4 and a plurality of hooks 5. The fix unit 4 is shaped as a disc, with a plurality of connection blocks 41 disposed around the circumference. The connection block 41 has an L-shape cross-section. The hanger accessory interface 3 further includes a plurality of protruding blocks 34, distributed evenly around the circumference of the hanger accessory interface 3 in a protruding manner. To assemble, the fix unit 4 aligns the connection blocks 41 to the protruding block 34, and then the fix unit 4 is rotates so that the protruding blocks 34 are stuck to the connection blocks 41. As a result, the fix unit 4 and the hanger accessory interface 3 are fixed together. In addition, to ensure the fixation between the fix unit 4 and the hanger accessory interface 3, an adhesive glue can be applied to the surfaces to contact of the fix unit 4 and the hanger accessory interface 3. Furthermore, the fix unit 4 and the hanger accessory interface 3 can also be fixed by a screw or glue directly, i.e., the connection blocks 41 and the protruding blocks 34 can be omitted. Also, the fix unit 4 further includes a hanging base 42, having a plurality of holes 421 for hanging the hanging hooks 5.

Figure 5:
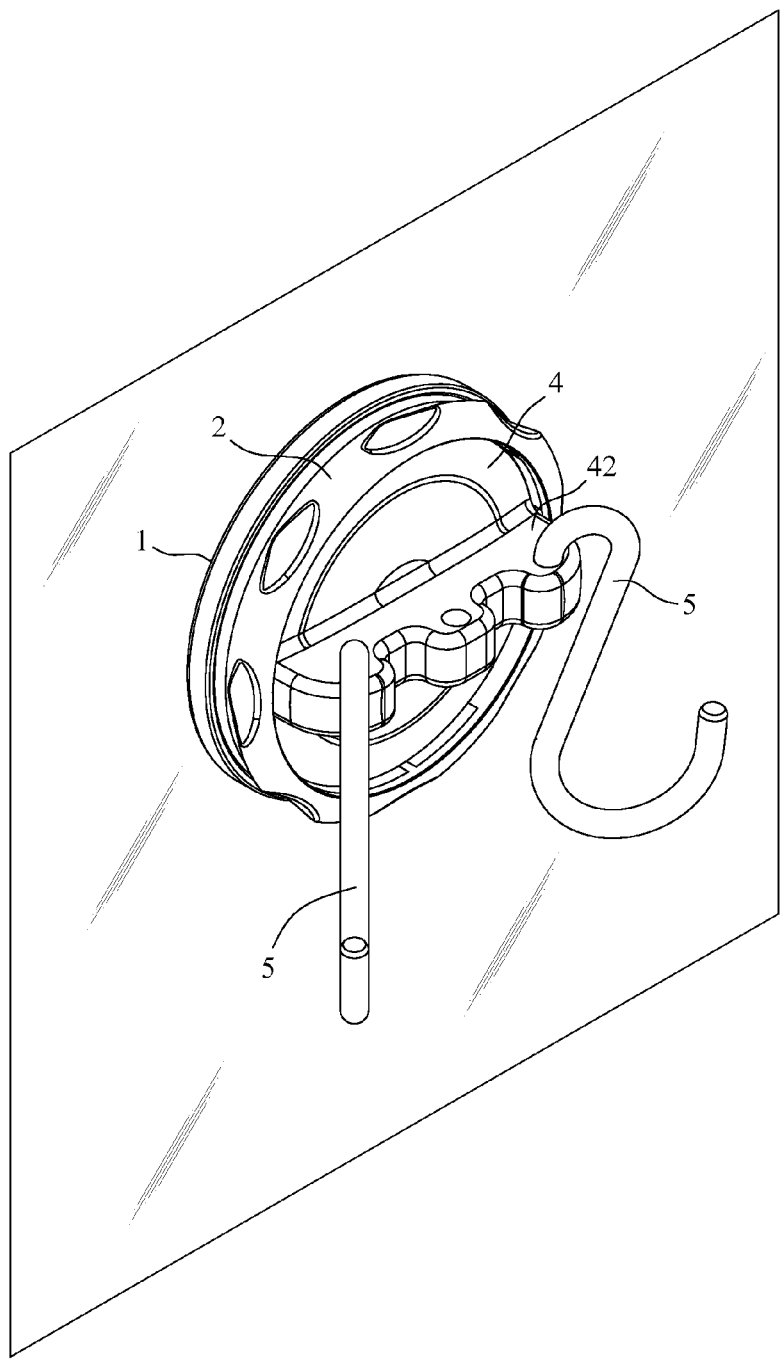
FIG. 5 shows a schematic view of the actual application of the exemplary embodiment, wherein the suction disc assembly is attached to a surface without tightly pressing into the surface.
Figure 6:
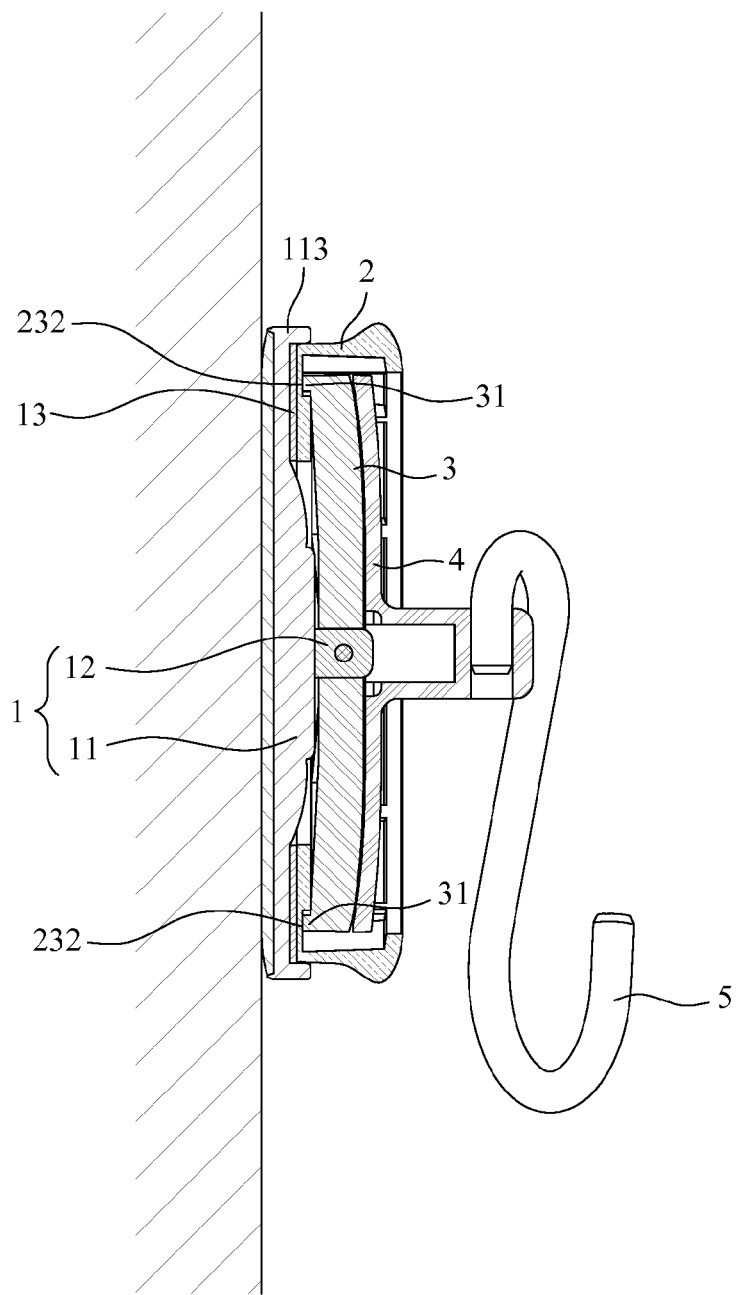
FIG. 6 shows a cross-sectional view of FIG. 5.
Figure 7:
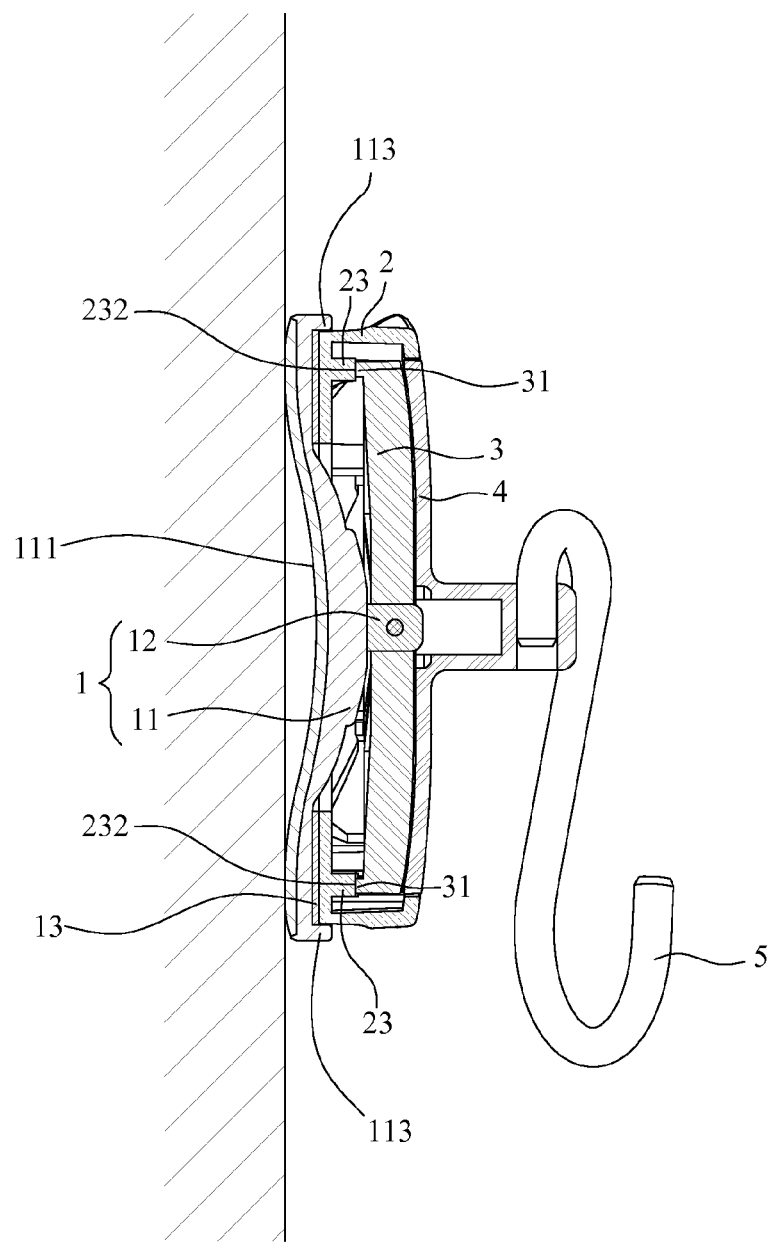
FIG. 7 shows a cross-sectional of the suction disc assembly tightly pressed against a surface.

FIG. 5 shows a schematic view of the actual application of the present invention, where the suction disc assembly 1 does not press tightly against a surface. FIG. 6 shows a cross-sectional view of FIG. 5, and FIG. 7 shows a cross-sectional of the suction disc assembly 1 tightly pressed against a surface. The suction disc assembly 1 is attached to a flat surface. In this state, the slider block 31 is located at the second positioning trench 232 of the tilt track 23 (as shown in FIG. 6). Then, the rotatable unit 2 is rotated and the tilt track 23 rotates synchronously. The slider block 31 gradually moves to inside of the first positioning trench 231 (as shown in FIG. 7). The hanger accessory interface 3 also drags the pull-up element 12 to move so that the center area of the suction disc 11 of the suction disc assembly 1 is pulled to arch up to create a suction force for attachment. Because the hanger accessory interface 3, the fix unit 4 and the hanging hook 5 are engaged together, the hanger accessory interface 4 will apply a pressure to the rotatable unit 2 when a heavy object is placed on the hanging hook 5. Refer to FIG. 7. Although a small part close to the upper edge of the hanger accessory interface 3 is possibly disengaged partially from the contact with the rotatable unit 2, the majority of the area remains in contact. As the rotatable unit 2 is a rigid body, the rotatable unit 2 remains tightly pressing against the suction disc 11 with a ring-shape contact surface to prevent the outside air from seeping into the arched up space generated by the attachment side 111 to accomplish the enhanced durability of the attachment.

Because the protruding ring 113 of the suction disc 11 surrounds the outskirt of the circumference of the rotatable unit 2, the contact position between the rotatable unit 2 and the suction disc will not be easily shifted, which further enables the rotatable unit 2 to tightly press against the suction disc 11 for better attachment.

In addition, the main component of the present invention includes only the suction disc assembly 1, the rotatable unit 2 and the hanger accessory interface 3; therefore, the overall thickness of the suction cup of the present invention is less than the thickness of the flip-type suction cup or rotation-type suction cup currently available.

Figure 8:
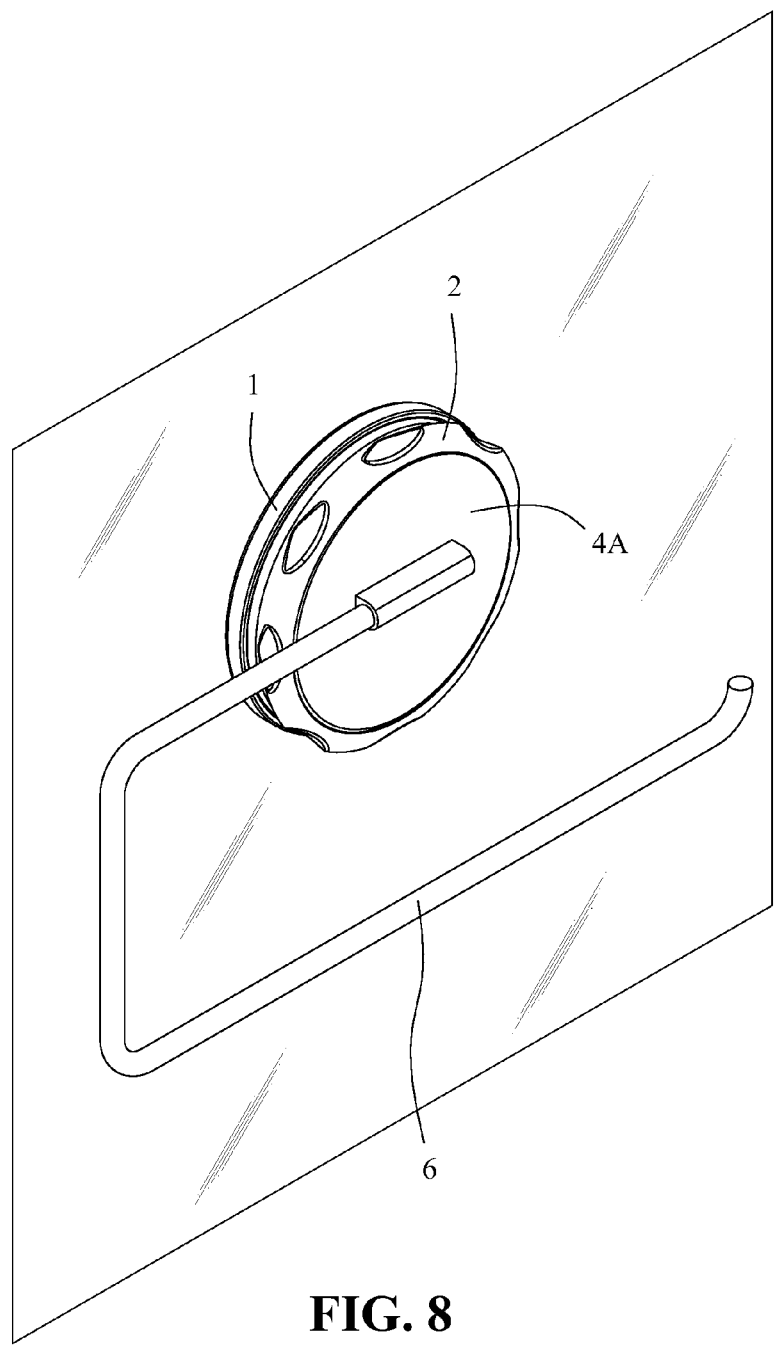
FIG. 8 shows a schematic view of another hanger accessory of the exemplary embodiment.
Figure 9:
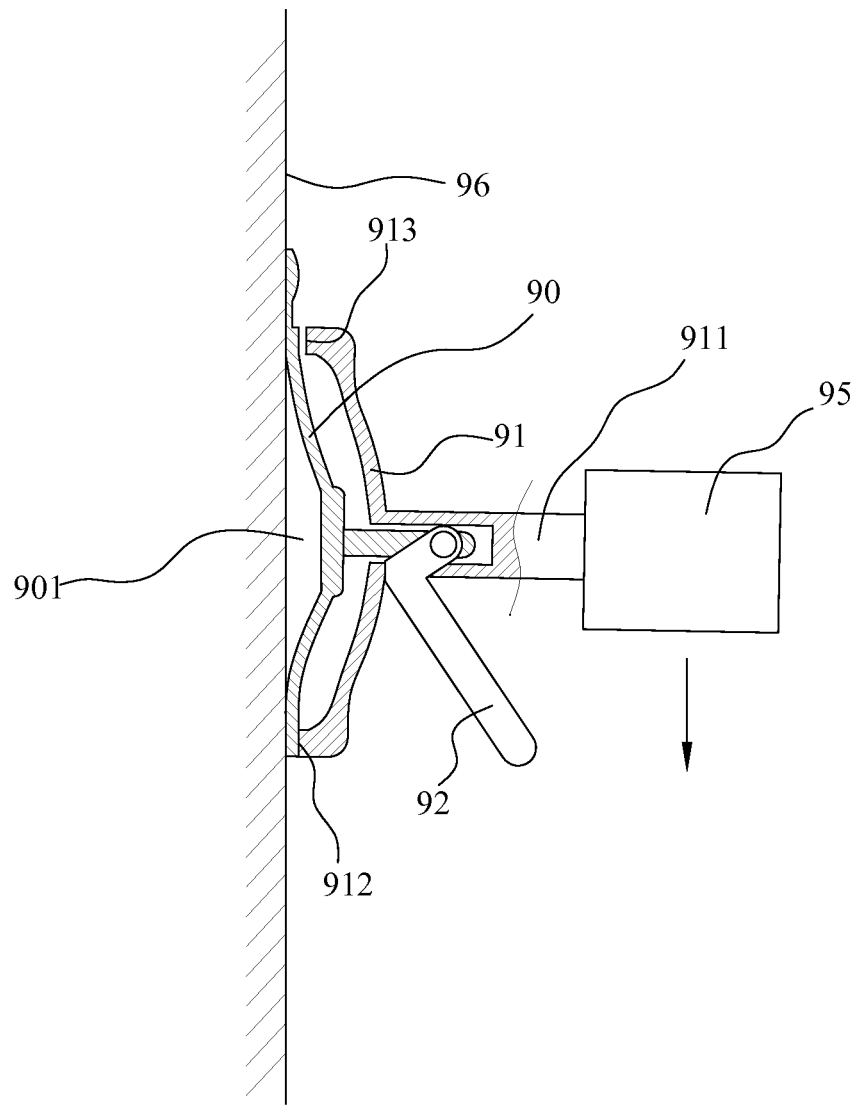
FIG. 9 shows a schematic view of a conventional suction cup.

FIG. 8 shows another actual application of the present invention. In this embodiment, the hanger accessory is a towel-hanger, including a fix unit 4A and a towel ring 6. The suction cup includes the suction disc assembly 1, the rotatable unit 2 and the hanger accessory interface 3, and the hanger accessory interface 3 is engaged to the fix unit 4A. As shown, the type of hanger accessory can vary for different applications.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A suction cup, comprising:
   a suction disc assembly, a rotatable unit and a hanger accessory interface;
   wherein the suction disc assembly comprises a suction disc and a pull-up element disposed on the suction disc;
   the rotatable unit comprises a carrier base, a penetration hole, and a plurality of tilt tracks, the tilt tracks being distributed around a ring-shaped inner wall of the carrier base and the penetration hole being formed at a center area of the carrier base;
   the hanger accessory interface is disposed inside the carrier base and contacts the suction disc through the carrier base;
   the hanger accessory interface comprises a plurality of slider blocks, with each slider block located at a corresponding tilt track;
   the pull-up element engages the hanger accessory interface through the penetration hole; and
   when the rotatable unit rotates, the tilt track and the slider block move with respect to each other, resulting in the hanger accessory interface dragging the pull-up element to move vertically so that the center area of the suction disc arches up inside the penetration hole.

2. The suction cup as claimed in claim 1, wherein
   the plurality of tilt tracks is distributed evenly around the ring-shape inner wall in a protruding manner,
   the hanger accessory interface is of a disc shape, with the plurality of slider blocks distributed around a circumference of the hanger accessory interface,
   the number of slider blocks is the same as the number of the tilt tracks,
   the hanger accessory interface is disposed inside the carrier base by each slider block located at the corresponding tilt track.

3. The suction cup as claimed in claim 1, wherein
   the tilt tracks have
      a slant top surface, having a first positioning trench 231,
      a first flat surface close to a top location of the slant top surface and a second positioning trench, and
      a second flat surface close to a bottom location of the slant top surface, and
   a location of the first positioning trench is lower than the top of the slant top surface.

4. The suction cup as claimed in claim 1, wherein
   the suction disc assembly further comprises a contact plate with a low friction coefficient,
   the suction disc comprises a suction side and a pressed side, opposite to each other;
   the contact plate is a ring-shape thin plate, disposed on the pressed side; when assembled, and
   the contact plate is located between the pressed side and the carrier base.

5. The suction cup as claimed in claim 4, wherein
   a protruding ring is formed at an edge of the pressed side,
   a space formed by the pressed side and the protruding ring is for the placement of the carrier base.

6. The suction cup as claimed in claim 1, wherein
   a via hole and a bolt trench are disposed at the center area of the hanger accessory interface;
   the bolt trench is connected to the via hole in a diameter direction without actually passing through the hanger accessory interface;
   the pull-up element further comprises a bolt hole and a bolt;
   when assembled, the pull-up element partially passes through the penetration hole to enter the via hole, and the bolt is partially inserted into the bolt hole through the bolt trench, so as to fix the pull-up element and the hanger accessory interface.

7. The suction cup as claimed in claim 1, wherein the hanger accessory interface further engages with a hanger accessory.

* * * * *